(12) United States Patent
Ortais

(10) Patent No.: US 7,684,909 B2
(45) Date of Patent: Mar. 23, 2010

(54) DATA TRANSMISSION METHOD AND DEVICE

(76) Inventor: Paul Ortais, 29 avenue Carnot, Verrieres-le-Buisson (FR) F-91370

( * ) Notice: Subject to any disclaimer, the term of this patent is extended or adjusted under 35 U.S.C. 154(b) by 957 days.

(21) Appl. No.: 11/332,826

(22) Filed: Jan. 13, 2006

(65) Prior Publication Data
US 2006/0215671 A1     Sep. 28, 2006

Related U.S. Application Data

(63) Continuation of application No. PCT/FR2004/050332, filed on Jul. 15, 2004.

(30) Foreign Application Priority Data

Jul. 15, 2003     (FR)     .................................. 03 08622

(51) Int. Cl.
*G06F 7/00*     (2006.01)
(52) U.S. Cl. .................. 701/36; 370/389; 370/450
(58) Field of Classification Search ......... 709/238–244; 701/1, 36; 370/389, 429, 450, 461; 710/106, 710/123
See application file for complete search history.

(56) References Cited

U.S. PATENT DOCUMENTS

| | | | |
|---|---|---|---|
| 5,777,762 A | | 7/1998 | Yamamoto |
| 5,995,257 A | * | 11/1999 | Johnson et al. ............... 398/83 |
| 6,072,804 A | | 6/2000 | Beyers, Jr. |
| 6,356,540 B1 | * | 3/2002 | Kojiro ........................ 370/330 |
| 6,427,066 B1 | * | 7/2002 | Grube ......................... 455/73 |
| 6,477,285 B1 | * | 11/2002 | Shanley ....................... 385/14 |

FOREIGN PATENT DOCUMENTS

EP     1 227 610     7/2002

* cited by examiner

*Primary Examiner*—Richard M. Camby
(74) *Attorney, Agent, or Firm*—Harness, Dickey & Pierce, P.L.C.

(57) ABSTRACT

The invention concerns a data transmission method, and its implementing device, in an integrated closed system of computers, such as, for example, in an aerial or land vehicle, comprising a step which consists in transmitting point-to-point data between two transmission nodes, for example via a wire system, each node having one or more channels enabling each transmission with a single node, a step which consists in converting data for transmission thereof, for example, in series. The invention is characterized in that it does not comprise any step of physical or logical control for authorizing and/or validating the transmitted data so that any data reception at a node is unconditionally followed by a retransmission, that is the control of the dataflows is implicitly determined by the cabled topology used.

20 Claims, No Drawings

DATA TRANSMISSION METHOD AND DEVICE

CROSS-REFERENCE TO RELATED APPLICATIONS

This is a continuation of Application No. PCT/FR2004/050332, filed Jul. 15, 2004, which claims priority to French Application No. 03/08622, filed Jul. 15, 2003; both of these applications are incorporated by reference herein.

BACKGROUND AND SUMMARY

The present invention relates to the field of methods and devices for transmitting data. The present invention relates more particularly to this type of method or device applied in a closed on-board control computer system, such as for example on an aircraft or land vehicle.

In fact, the object of the present invention concerns systems using a plurality of computers, sensors, actuators and the communication network connecting them. At the present time, such systems are used for the control of complex automatic systems demanding in terms of performance, such as aerospace, land or marine vehicles. In the prior art, computers are connected by buses, which are used for the following two functions:
- physically connecting the calculators for the exchange of data (medium),
- arbitrating the access of the computers to the medium in terms of transmission and the acceptance of messages in terms of reception.

This practice in the use of computer buses has the following constraints and limitations:
- the bus is a common circulation point for the data in the system and puts its security in danger in the event of a fault;
- the probability of a fault on the bus is high since many nodes are connected to it,
- the bus allows only one sender simultaneously, which slows down exchanges,
- the bus imposes a protocol for arbitrating access to the bus, identifying the sender and its destinations, and confirming the arrival of the messages,
- the bus arbitration consumes two important resources on each node: the hardware part entrusted to the physical protocol controller, the cost of which comes from the circuitry used, and the software part which consumes an important part of the program memory and of the node calculation power. In fact it frequently happens that, in a current system, the control of the bus consumes the majority of the hardware and software resources of the system.

The basic justification of the bus is to eliminate many cabled connections. In several cases, three drawbacks appear together or independently:
- cost of the node: the bus cannot extend to the most simple sensors and actuators when the cost of a node does not justify this,
- propagation time: certain rapid signals cannot transit over a bus since the latter is slowed down by its protocol,
- security signals: the critical-security signals cannot follow the bus because of the limitation mentioned above.

The result of these limitations is that, in current systems, the bus best transports the slow non-security signals, to expensive peripherals. A significant amount of cabling remains to the nodes having a security constraint, a time constraint and/or cost, limiting the economical advantage of bus deployment.

The physical communication medium, typically electric cable, has its possibilities reduced when the following are used as a bus:
- connecting many nodes to a conductor, according to an arrangement dependent on the applications, requires the specification of strict electrical standards, itself lengthy and expensive to develop and then comply with;
- the physical interface from the node to the bus supports these constraints, which result in an additional hardware cost. At the present time, it is normal to add passive filtering and protection components to it and to adjust these additional circuits to the final system in order to obtain a correct behaviour of the bus;
- the communication protocol also imposes constraints reducing the performance of the physical medium. For example, the twisted cable used according to the standard EIA644 allows a rate greater than 500 Mbits/s (megabits per second) and the same cable employed according to ISO 11898 (CAN bus) known as the industry standard, transmits at best only one 1 Mbit/s. These two orders of magnitude of loss of bandwidth stem from a major constraint of the protocol, the acknowledgement of the messages by their last bit.

The prior art already knows a solution described in patent application WO 0114976, which discloses a system in which there is a transfer of data between a first use on a first computer and a second use on a second computer. The connection preferably takes place by means of an optical data transfer process. The uses communicate with substitute uses provided on each of the identical computers, without specific special instructions of the buses necessarily being taken into account. However, in all the systems existing up to the present time, it has never been envisaged using no computer bus since these are considered to be essential for the data transmission network. The present invention sets out to remedy the drawbacks of the prior art by producing an equivalent system avoiding the use of buses, and eliminating the physical protocol controller, the logic circuit authorising and validating the transmissions and the logic protocol controller, the software part of the nodes specific to the use of the bus, which are, of course, linked to the presence of computer buses.

In the prior art European Patent Application EP 0 450 879 (Hunting Communication Tech) "Ring communication system" is also known. This document concerns a communication system in which a plurality of nodes or units affording access to terminals are connected by means of a support ring. The data are transmitted in series of data packets within which the bits or bytes are multiplexed. Each of the access units has channels pre-allocated to the inside of the packet in order to ensure the availability of the line and to prevent congestion and waiting. It mentions the use of channels preallocated to the inside of the packet, which relates to a mechanism for selecting data by time slices: each node samples in the time slice or slices assigned to it. This document therefore in no way mentions a system in which no physical or logic control step for the authorisation and/or validation of the data transmitted is performed. The solution disclosed in this document involves a strong time dependency of the data and an expensive time management since each node must repeat the time sorting and assign thereto hardware resources which would not need to exist without any physical or logic control on the data transmitted (in particular the local clocks of the nodes must not drift from each other, in which case the collisions between data would be all the more numerous, the greater the drifts).

To do this, the present invention concerns a method of transmitting data in a closed on-board control computer system, such as for example in an aircraft or land vehicle, comprising a step of transmitting data point to point between two transmission nodes, for example via a cabled network, each node possessing one or more channels each allowing transmission with a single node, a step of converting data for their transmission, for example in series, characterised in that it comprises no physical or logic control step for the authorisation and/or validation of the data transmitted so that any reception of data at a node is followed unconditionally by a resending, that is to say the control of the data flows is determined implicitly by the cabled topology used. The originality and innovative aspect of the present invention lie in the absence of control step both physical and logic for the authorisation and/or validation of the data transmitted. This has the effect of significantly reducing the data management costs at each node. The invention concerns a method where the topology determines the data transmission behaviour on each node, in the absence of the allocation of time windows to each node. In the invention, several nodes can send data simultaneously, independently of any synchronisation of the nodes by a common clock. The invention is therefore characterised in particular by the absence of a master clock controlling all the nodes, and by the absence of a node synchronisation signal, which is possible because each node, in the invention, constitutes a network part ensuring the reception and retransmission of the data.

The resending normally takes place over another channel, except if the data are circulating on a channel "without exit" or with a dead end, in which case there is therefore an echo, and the result is a propagation and the data flow is therefore defined principally by the topology of the cabling. In the case of a sending of "erroneous" data or an "erroneous" message, the system according to the invention functions substantially like the systems of the prior art, that is to say the device unconditionally transmits the information relating to the incorrect status of its data. Advantageously, the method can also comprise a step of entering the status of the nodes through which the data are transmitted or conveyed.

Each transmission node will preferably sample the content pertinent for its control task from the data transmitted. Advantageously, the method of the invention will comprise a step of generating and sending data through an initiating node sending periodically and imposing its period on the rest of the system.

The method according to the invention preferably comprises a second node becoming the "initiator" in the event of failure of the first initiating node. According to a particularly advantageous aspect of the invention, the data, remaining unchanged and once again passing through the node originating the data, will be transmitted in a reduced form signifying their consistency. Likewise, advantageously, each data transmission node will comprise a sampling table suitable for authorising the sampling of the data necessary for its control task. Advantageously, each transmission node will be programmable and reprogrammable according to a code transmitted by the adjacent nodes. Advantageously, each node will transmit a commentary relating to the delay, deformations, distortions or repetition in the case where the data transmitted are actually received respectively with a delay, a deformation, a distortion or a repetition.

The present invention also relates to the device implementing the method described above. This device comprises nodes connected together by cabled or optical link, for the circulation of said data according to a "point to point" connection network, characterised in that it comprises no protocol controller nor computer bus.

By virtue of the invention, a method is produced for coordinating a system of on-board control computers by the combination of three means:
point to point links between computers,
a mechanism for the automatic circulation of the data without a protocol controller,
prior numbering of the messages from the computers for the entire system.

The limitations of the prior art observed in a bus system are therefore resolved as follows:
the loss of a link or of a node does not inhibit the entire system, only the connection or component concerned,
there are as many simultaneous transmissions possible as there are links,
on a link the identification functions of the sender and destination are unnecessary,
the node is simpler since it does not have the hardware elements necessary in a system with computer buses, it is possible to disseminate more and therefore to reduce the cabling to the most simple sensors or actuators. According to a particularly advantageous aspect of the invention, these more simple, non-specialised and more numerous nodes are more economical;
a point to point link according to the invention is much more rapid than a bus,
the security cabled connections essential in the prior art are replaced according to the invention by redundant links,
simplicity of implementation of the point to point connection,
for the same reason, the point to point interfaces are known to be more simple and economical.

The invention will be understood better with the help of the description, given below purely for explanatory purposes. It has not been chosen, in order to illustrate the invention, to produce one or more schematic figures since a person skilled in the art is perfectly capable of apprehending and visualising the hardware elements to which reference will be made hereinafter.

In the prior art, the connection systems for the transmission of data function with buses according to the following elements and characteristics:
1. physical medium typically one or more wires, twisted pairs, optical fibres,
2. hardware interface, a logic circuit converting the data for transmission thereof in series,
3. physical protocol controller, a logic circuit which arbitrates access to the bus, authorises and validates the transmissions,
4. protocol logic controller, a software part of the nodes specific to the use of the bus,
5. application, a software part of the node providing its control function.

We shall see hereinafter how the object of the method according to the invention achieves a data transfer without requiring steps 3 and 4 above.

DETAILED DESCRIPTION

According to the present invention, the bus is replaced by a network of point to point connections. In the context of the present invention, the "link" signifies a connection between no more than two nodes. The network according to the invention is disposed so as to provide at least two independent paths between any pair of nodes exchanging data deemed to be security data. Some nodes have only one link, for example those controlling a sensor or an actuator, any loss of which is not critical to the point of justifying redundant links. Certain nodes have two links and make it possible to form structures in a chain or ring. Certain nodes have three links for grouping together chains or rings of nodes and constituting a plurality of more complex structures.

To ensure the circulation of data without the protocol control devices, the invention defines a communication mechanism without the complexity that justifies these devices, namely there are systematic and unconditional transmissions and receptions of data. The messages propagate from node to node. One implementation according to the invention is described by the fact that any reception of a message by a node is followed unconditionally by a resending of the message in an identical fashion or a message commenting on any error or fault in the message such as a delay. The method of the invention uses closed paths, so that the messages sent return to their originator. Any node is an originator of the messages carrying its status and that of its actuators, the measurements made by the sensors that it controls and possibly its identification.

A node receiving a message for which it is the originator propagates it with an updated content. If the message has another originator, it is simply propagated, the propagating node then sampling from it any content pertinent for its control task. This behaviour is fairly simple in order to be provided directly by steps 2 and 5 indicated above. It is therefore possible to implement the invention without having recourse to specialised devices in the management of a protocol, for example using only an asynchronous serial port, which is the essential aim of the invention.

The physical interfaces at the two ends of a link must be compatible. It is possible according to the invention to use one physical standard for one link and another standard for another link of the same node, provided that this heterogeneity is compatible with the requirements in terms of the speed of propagation.

Other non-essential behaviours are generally necessary in an advantageous embodiment of the device and method of the invention:
  a node called the initiator transmits periodically, imposing its transmission period on the rest of the system,
  at least one second node becomes the initiator in the case of failure of the first,
  in the closed arrangements, the initiator and the following nodes send in both directions, which provides resistance to the loss of an element,
  a particular strategy governs the propagation of the heartbeat between two closed circuits,
  the messages with unchanged content are propagated in a reduced form signifying their consistency,
  the correct functioning of the propagation chain forms part of the status transmitted by the node; this making it possible to locate breakdowns.

The messaging used by the system is defined prior to the assembly thereof. Each node is attributed one or more peculiar identifiers in relation to which it marks the messages that it initiates. In the simple case of a node sending only one type of message, for example an elementary sensor, the message has an identifier which is de facto the identifier of the sending node. For complex nodes, a plurality of identifiers is possible. Likewise, each node holds a table enabling it sample the data necessary for its control task. This table associates with the messages, recognisable by their identifiers, the position of the pertinent data item in the message. No explanations relating to the above mentioned tables will be developed further since they are well known to persons skilled in the art and are used here to fulfil their conventional functions.

In one embodiment according to the invention an on-board control system consists of two subsystems:
a first subsystem (ABCD): nodes A, B, C, D, and
a second subsystem (EFGH): nodes E, F, G, H.

Nodes A and B, B and C, C and D, D and A are respectively connected to each other and the connection forms the corresponding links ab, bc, cd, da. The first subsystem is connected by the most simple closed network, a ring. In the same way, the nodes E and F, F and G, G and H, H and E are connected to each other and the connection forms the corresponding links ef, fg, gh, he. The second subsystem is also connected by the most simple closed network, a ring. Once again, the node D is connected to the node E forming the link ed, and the node H is connected to the node A forming the link ha, the links ed and ha connected the two subsystems ABCD and EFGH.

It should be noted hereinafter that all the links are bi-directional. It is considered that:
  node A has a sensor cA,
  node G has a sensor cG,
  node F has a actuator aF,
  node F controls aF from the measurements of cA and cG.

The rules defining the circulation of the data in the embodiment according to the invention are as follows:
  each node (ABCDEFGH) sends cyclically a message carrying the identification of their originator, and the measurements of its sensors,
  these messages circulate in each subsystem, from node to node, in both directions, until they are re-read by their originator. The latter then propagates them with any updating of the measurements transported,
  a node controlling an actuator takes off the data concerning it as they pass.

A node controlling a sensor or an actuator has its activation rule, and it suffices for the pertinent data to be produced in the network. If the activation of an actuator produces a pertinent data item at another point in the system, then the node concerned sends this data item in its status message. It is not necessary for this node (the program that it stores) to know the pertinence or use of this data item elsewhere in the system.

The other rules relating to the device according to the invention are expressed as follows:
  the messages received by a node are endogenous, that is to say the receiving node is the initial sender of them, or exogenous, that is to say the message was sent by another node;
  the endogenous messages are replaced immediately by an updated version.

An endogenous message still up to date, that is to say identical to the updated version, is resent in its short form, comprising only the identification of the node and an identity flag. The short messages reduce the communication energy of the system;
  the exogenous messages are propagated without delay. Their data are used locally only after the start of their resending;
  a message judged to be "erroneous" is replaced by an error flag, which serves only to synchronise the following exchanges;
  the node A initiates the exchanges of the subsystem ABCD by sending first, in both directions, on powering up. It also sends to the node H. The latter in its turn initiates the exchanges of the subsystem EFGH. If node A is faulty, node H becomes the initiator of the system by sending in (EFGH);

the initiator A (or H in the case of a fault in A) derogates from the rules by transmitting periodically instead of propagating the messages without delay. It complies with a transmission period which defines the heartbeat of the system. Because of the propagation of the messages without delay, the exchanges in the system occur in a first part of the heartbeat, from transmissions of the initiator, and then the system becomes silent until the end of the period, awaiting the next heartbeat.

The present invention uses an isochronous synchronisation, by virtue of the idle periods between two heartbeats, with however a time precision which is that of the clock of the initiator. By way of comparison, the isochronous mode is more simple and is therefore more economical than a synchronous mode, which would require significant resources for synchronising all the links, like the TTP protocol (Time Triggered Protocol).

According to one embodiment intended to illustrate the invention, the messages of A and G are in the following form:
identification of the message: 16 bits,
status of the node: 16 bits,
measurement of the sensor: 16 bits,
control key: 16 bits, the connection uses an LVDS (low voltage data signalling) twisted pair at 32 Mbits/s, the heartbeat of the system is defined at 100 µs, the transfer time for a message: 64 bits to 32 Mbits/s: 2 µs the propagation time through the node: 3 µs. If the example is taken of the routing of data from cA [cA] and cG [cG] to aF (nodes from A to F). The data from cA, sent by A to $T_0$, arrive at F after 10 µs of transfer ($T_0$+10 µs). A receives its message at the end of the loop, acknowledges it, prepares any updated version . . . $T_0$+15 µs. The subsystem is inactive, that is to say at very low consumption until the next cycle $T_0$+100 µs. The only activity between $T_0$+15 and $T_0$+100 is the clock of A counting down the cycle end. It is of minor importance that [cG] arrives at F in 5 µs directly through G and in 15 µs through H and E.

In order to completely illustrate the method and device according to the invention, it will be possible also to describe the possible cases of breakdowns in the following manner:
Loss of a link:
in the prior art:
1. electrical problem on a bus, the entire bus is lost (all the nodes isolated). It is not possible to determine the location of the fault.
2. Electrical problem on the branch connecting a node; the node is lost.
In the method of the invention:
the loss does not affect the adjacent links; there is always at least one second path between two nodes; the location of the breakdown is known.
Loss of a node:
in the prior art:
possibility of the entire bus being faulty (interrupted transmission or electrical problem),
in the method according to the invention:
at worst, isolation of the node, the faulty node being known.
Loss of the initiating node:
in the prior art:
the bus does not start,
in the method according to the invention:

after expiry of the first transmission time, the second initiator transmits, and we go back to the previous case (loss of a node).
Erroneous message on transmission:
in the prior art:
triggering of error procedures, modifying the time determinism of the system,
in the method according to the invention:
message not propagated by the adjoining nodes, or with explicit notification of doubt (the time determinism is preserved).

The invention is described above by way of example. Naturally a person skilled in the art is in a position to produce different variants of the invention without for all that departing from the scope of the patent.

The invention claimed is:

1. A method of transmitting data in a closed on-board control computer system comprising a step of transmitting data point to point between two transmission nodes, each node having one or more channels each allowing transmission with a single node, a step of converting data for transmission thereof, and wherein any reception of data at a node is followed unconditionally by a retransmission and the control of the data flow is determined implicitly by the transmission topology used.

2. The method of transmitting data according to claim 1, further comprising a step of writing the status of the nodes through which the data are transmitted or conveyed.

3. The method of transmitting data according to claim 1, further comprising each transmission node takes off the content pertinent for its control task from the data transmitted.

4. The method of transmitting data according to claim 1, wherein the data, remaining unchanged and passing once again through the node originating the data, are transmitted in a reduced form signifying their consistency.

5. The method of transmitting data according to claim 3, wherein each data transmission node comprises a sampling table able to authorise the sampling of the data necessary for its control task.

6. The method of transmitting data according to claim 1, wherein each transmission node is programmable and reprogrammable according to a code transmitted by the adjacent nodes.

7. The method of transmitting data according to claim 1, wherein each node transmits a comment relating to the delay, to the deformations, distortions or repetition in the case where the data transmitted are actually received respectively with a delay, deformation, distortion or repetition.

8. The method of transmitting data according to claim 1, further comprising nodes connected together by cabled connection for the circulation of the said data according to a "point to point" connection network, wherein there is no protocol controller nor computer bus.

9. A data transmission system, comprising:
a data transmission medium;
at least two transmission nodes operably connected to said transmission medium, wherein each of said nodes has one or more channels each allowing transmission with a single node; and
a control computer operably connected to said transmission medium wherein said control computer operably transmits data point to point between said two transmission nodes and converts data for transmission thereof, and wherein said control computer performs no physical or logical control for authorisation and/or validation of the data transmitted, thereby ensuring that any reception of data at a node is followed unconditionally by a retransmission, and that control of flow of the data is determined implicitly by a connection topology of a network formed of said nodes and said transmission medium.

10. The system of claim 9, wherein said control computer operably writes status of nodes through which the data are transmitted or conveyed.

11. The system of claim 9, wherein each transmission node takes off content pertinent for its control task from the data transmitted, each data transmission node having a sampling table authorising sampling of the data necessary for its control task.

12. The system of claim 9, wherein the data, remaining unchanged and passing once again through the node originating the data, are transmitted in a reduced form signifying their consistency.

13. The system of claim 9, wherein each node transmits a comment relating to the delay, to the deformations, distortions or repetition in the case where the data transmitted are actually received respectively with a delay, deformation, distortion or repetition.

14. The of claim 9, further comprising nodes connected together by cabled connection for the circulation of the said data according to a "point to point" connection network, wherein there is no protocol controller nor computer bus.

15. A method of transmitting data in a closed on-board control computer system comprising the steps:
    transmitting data point to point between two transmission nodes, each node having one or more channels each allowing transmission with a single node;
    generating and sending data by an initiating node, said initiating node periodically transmitting and imposing its period on the rest of the system; and
    converting data for transmission thereof;
    wherein no physical or logic control step for the authorisation and/or validation of the data transmitted so that any reception of data at a node is followed unconditionally by a retransmission and the control of the data flow is determined implicitly by the transmission topology used.

16. The method of transmitting data according to claim 15, further comprising a second node becoming the "initiator" in the event of failure of the first initiating node.

17. The method of transmitting data according to claim 15, further comprising each transmission node takes off the content pertinent for its control task from the data transmitted, wherein each data transmission node comprises a sampling table able to authorise the sampling of the data necessary for its control task.

18. The method of transmitting data according to claim 15, wherein each node transmits a comment relating to the delay, to the deformations, distortions or repetition in the case where the data transmitted are actually received respectively with a delay, deformation, distortion or repetition.

19. A data transmission system, comprising:
    a data transmission medium;
    at least two transmission nodes operably connected to said transmission medium, wherein each of said nodes has one or more channels each allowing transmission with a single node;
    a control computer operably connected to said transmission medium wherein said control computer operably transmits data point to point between said two transmission nodes and converts data for transmission thereof, and wherein said control computer performs no physical or logical control for authorisation and/or validation of the data transmitted, thereby ensuring that any reception of data at a node is followed unconditionally by a retransmission, and that control of flow of the data is determined implicitly by a connection topology of a network formed of said nodes and said transmission medium; and
    wherein said control computer operably generates and sends data by an initiating node periodically transmitting and imposing its period on the rest of the system, and a second node becomes the "initiator" in the event of failure of the first initiating node.

20. A data transmission system according to claim 19, wherein each node transmits a comment relating to the delay, to the deformations, distortions or repetition in the case where the data transmitted are actually received respectively with a delay, deformation, distortion or repetition.

* * * * *